United States Patent [19]

He et al.

[11] Patent Number: 5,517,924
[45] Date of Patent: May 21, 1996

[54] DOUBLE ROW LOOP-COIL CONFIGURATION FOR HIGH-SPEED ELECTRODYNAMIC MAGLEV SUSPENSION, GUIDANCE, PROPULSION AND GUIDEWAY DIRECTIONAL SWITCHING

[75] Inventors: Jianliang He, Naperville; Donald M. Rote, Lagrange, both of Ill.

[73] Assignee: The United States of America as represented by the United States Department of Energy, Washington, D.C.

[21] Appl. No.: 280,962

[22] Filed: Jul. 27, 1994

[51] Int. Cl.$^6$ .................................................. B60L 13/02
[52] U.S. Cl. ...................... 104/286; 104/282; 104/130.02
[58] Field of Search .................................. 104/281, 282, 104/285, 286, 292, 290, 284

[56] References Cited

U.S. PATENT DOCUMENTS

| | | | |
|---|---|---|---|
| 3,470,828 | 10/1964 | Powell | 104/281 |
| 3,664,268 | 5/1972 | Lucas | 104/281 |
| 3,913,493 | 10/1975 | Maki | 104/281 |
| 3,968,753 | 7/1976 | Breitling | 104/130.02 |
| 3,994,236 | 11/1976 | Dull | 104/130.02 |
| 5,270,593 | 12/1993 | Levi | 104/282 |
| 5,361,707 | 11/1994 | Fujie | 104/286 |

OTHER PUBLICATIONS

Vol. 2—System Concept Definition Report for the National Maglev Initiative dtd 30 Sep. 1992 Magneplane International, Inc.—Section 3.2.2.d Magswitch pp. 49–58.

Electrodynamic Suspension and Linear Synchronous Motor Propulsion for High Speed Guided Ground Transportation—Sep. 1977, Canadian Maglev Group—pp. 77–81.

*Primary Examiner*—Robert J. Oberleitner
*Assistant Examiner*—C. T. Bartz
*Attorney, Agent, or Firm*—Bradley W. Smith; Hugh Glenn; William R. Moser

[57] ABSTRACT

A stabilization and propulsion system comprising a series of loop-coils arranged in parallel rows wherein two rows combine to form one of two magnetic rails. Levitation and lateral stability are provided when the induced field in the magnetic rails interacts with the superconducting magnets mounted on the magnetic levitation vehicle. The loop-coils forming the magnetic rails have specified dimensions and a specified number of turns and by constructing differently these specifications, for one rail with respect to the other, the angle of tilt of the vehicle can be controlled during directional switching. Propulsion is provided by the interaction of a traveling magnetic wave associated with the coils forming the rails and the super conducting magnets on the vehicle.

18 Claims, 7 Drawing Sheets

DOUBLE ROW LOOP-COIL CONFIGURATION FOR HIGH-SPEED ELECTRODYNAMIC MAGLEV SUSPENSION, GUIDANCE, PROPULSION AND GUIDEWAY DIRECTIONAL SWITCHING

CONTRACTUAL ORIGIN OF THE INVENTION

The United States Government has fights in this invention pursuant to Contract No. W-31-109-ENG-38 between the U.S. Department of Energy and the University of Chicago.

BACKGROUND OF THE INVENTION

This invention relates to a suspension, guidance, propulsion and directional switching system for a high-speed electrodynamic suspension (EDS) magnetically levitated (maglev) vehicle and more particularly, to a maglev system in which a series of interlinked coils or loops are mounted on a flat or multi-slitted surface or guideway. This system provides suspension, lateral guidance and propulsion for the vehicle. The invention further includes changes in the active coil patterns to provide guideway directional switching.

The EDS maglev suspension and guidance system uses the repulsive magnetic forces generated by the interaction between the magnetic field produced by the eddy currents induced in the guideway mounted conductors and the magnetic field of the superconducting magnets (SCMs) aboard the vehicle to provide the required suspension and guidance for the system. Historically, several EDS suspension systems have been employed: continuous sheet suspension, loop-shaped coil suspension, and null-flux coil suspension.

The continuous sheet suspension system uses continuous conducting sheets oriented beneath the moving SCMs to provide suspension for the maglev. In this case, the repulsive suspension force is generated from the interaction between the magnetic field produced by the SCMs and the magnetic field generated by the eddy currents induced in the conductive sheet by the moving SCM field. This interaction provides a force normal to the plane of the sheet and, thus, levitation for the vehicle. The sheet, however, does not provide a stable guidance force for the vehicle. The guidance force is a force which is oriented in a direction perpendicular to the direction of motion of the vehicle and the suspension force. To obtain a stable guidance force, for this system, other conductor arrangements are required.

The single row loop-shaped coil suspension operates along a similar principle similar to that of the continuous sheet. With this system, the repulsive suspension force is generated as a result of the interaction between the magnetic force of the SCMs and the magnetic field produced by the induced eddy currents in the loop-shaped coils. This technique provides a large lift-to-drag ratio relative to the continuous sheet system. However, like the continuous sheet system, the loop-shaped coil suspension system cannot provide a stable lateral guidance force.

The combined null-flux coil suspension system consists of two vertically-oriented arrays of figure-eight-shaped loop-shaped coils arranged so that each single upper and lower loop coil is cross-connected to form a figure-eight-shaped null-flux coil and each array of figure-eight-shaped null-flux coils on the left-hand side of the guideway are connected with those on the fight-hand side to form a combined system. As a result of the cross-connections, a current flowing clockwise in the upper coil would flow counterclockwise in the lower coil, or reciprocally a counterclockwise current in the upper coil would result in a clockwise current in the lower coil. The combined null-flux coil arrangement is superior to either the continuous sheet suspension or the loop-coil suspension because it can function both as a means of supplying stable levitation forces and guidance forces. The combined null-flux system, also, has a high lift-to-drag ratio and a high guidance-to-drag ratio. This system is currently employed in the Japanese EDS maglev system. One of the main disadvantages of this system is that it requires side walls to support the null-flux coils and it needs to have cables crossing back and forth across the guideway to provide cross-connections to produce both suspension and guidance forces. When an energized coil, for example an SCM, passes midway between the null-flux coils, no net current is induced in the null-flux coils because they are cross connected or counter wound hence the term "null-flux". When the SCM is displaced from the midplane or neutral position relative to the upper and lower null-flux coils, a large net current is induced in the coils with the result that a strong repulsive force acts to restore the SCM to the neutral or "null-flux" position. A disadvantage of the current null-flux system designs is that it tends to couple lateral displacements with rolling and yawing motions. Some maglev design concepts utilize the same vehicle magnets to perform more than one of the basic functions, suspension, guidance, or propulsion. This multiple tasking occurs when the vehicle magnets interact with suitable guideway mounted devices.

The guideway directional switches currently employed by Germany and Japan in their maglev system designs require either physically bending or moving a section of concrete guideway to change the direction of motion of the maglev vehicle. Applicants' double row loop coil EDS suspension and guidance system can overcome the limitations in suspension, guidance, and directional switching systems referenced above.

Thus, it is an objective of this invention to provide a suspension, guidance and propulsion system which can be mounted on an unbounded platform or guideway, therefore, eliminating the need for sidewalls. In the alternative, the outer edge of the coils for each row can be bent to form a multi-slotted system which also eliminates the need for sidewall mounted coils.

A further objective of this invention is to provide for an electromagnetic guideway directional switching system to control the direction of travel of the maglev vehicle.

An additional objective of this invention is to configure the loop-coils on one side of the switching mechanism different from the coils on the other side of the mechanism to control the tilt angle of the maglev vehicle during directional switching.

Additional advantages, objects and novel features of the invention will become apparent to those skilled in the art upon examination of the following and by practice of the invention.

SUMMARY OF THE INVENTION

To achieve the foregoing and other advantages, this invention comprises a set of double-row loop-coils, oriented along the direction of travel of the vehicle, to form a pair of magnetic rails which provides levitation and guidance to a maglev vehicle. By changing the design of the loop-coils of the respective rails the tilt of the vehicle can be altered. In addition, by employing a directional switching mechanism to activate a select set of magnetic rails and deactivate another set, the direction of travel of the vehicle is altered. Propulsion is achieved by interconnecting select loop-coils of the magnetic rail to a multiphase power source to provide a traveling magnetic wave.

BRIEF DESCRIPTION OF THE DRAWINGS

The present invention is illustrated in the accompanying drawings where.

DETAILED DESCRIPTION OF THE INVENTION

Figure 1:
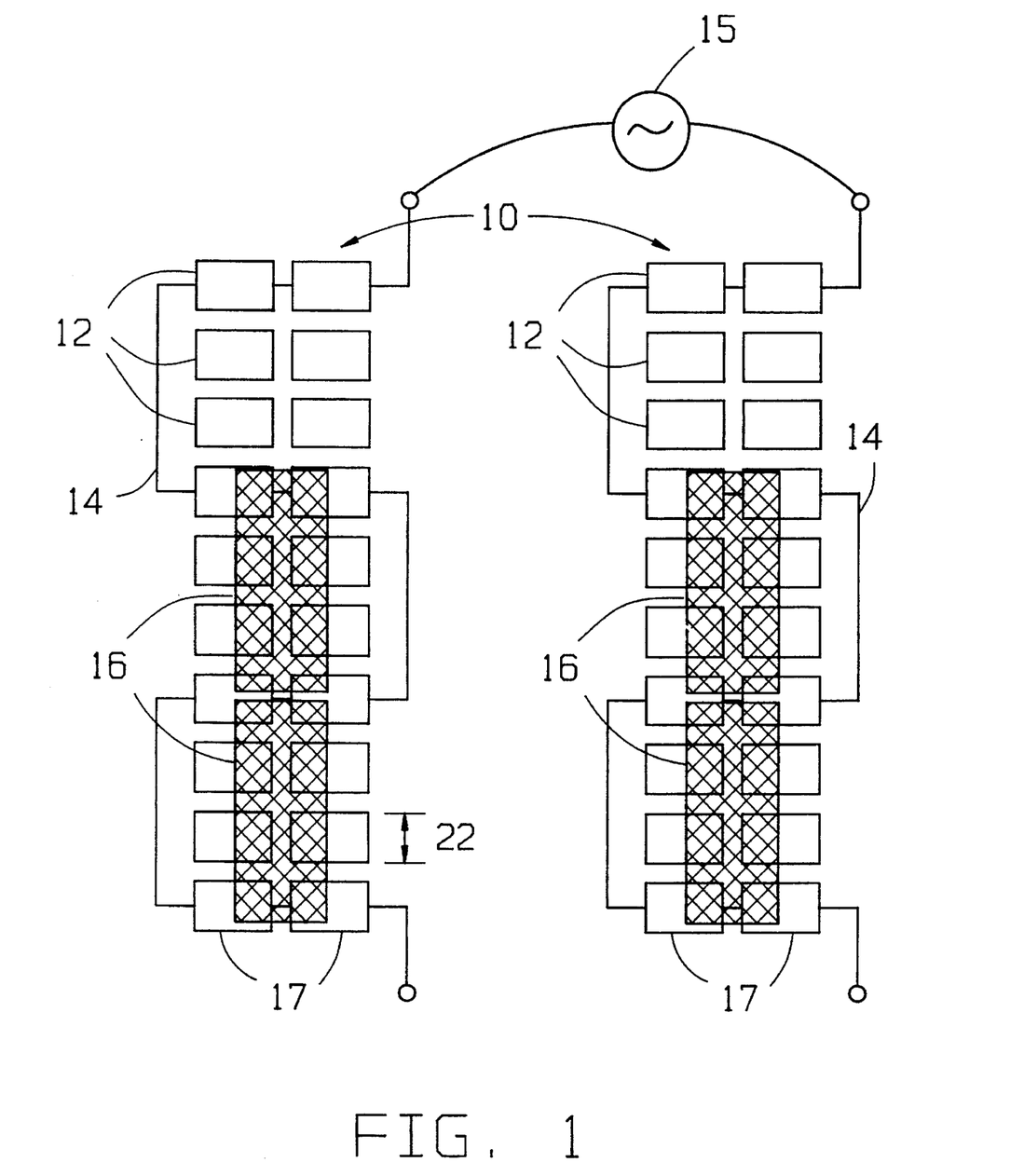
FIG. 1 is a schematic showing the double-row loop-coils and one phase of the propulsion coil in relation to the superconducting magnets mounted in the vehicle.

FIG. 1 depicts a top view of the double-row loop-coil system 10 together with the vehicle mounted superconducting magnets (SCM) 16. In one embodiment, the double-row loop-coil system 10 encompasses four rows of loop-shaped, multiwound conducting coils 12 arranged in parallel to form two magnetic rails 17 where each rail 17 consists of two rows of coils or a double-row arrangement. Both levitation and guidance forces are generated from the interaction between the magnetic fields of the SCMs 16 aboard the vehicle 18, FIG. 2, and the magnetic fields associated with the eddy currents induced in the loop-coils 12.

Figure 2A:
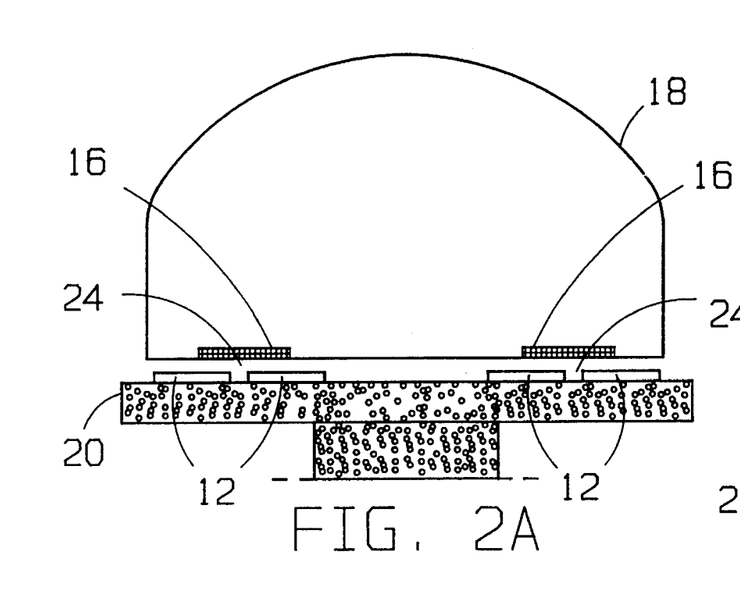
FIG. 2A illustrates the relation between the superconducting magnets mounted in the vehicle with respect to the loop coils mounted on the guideway.
Figure 2B:
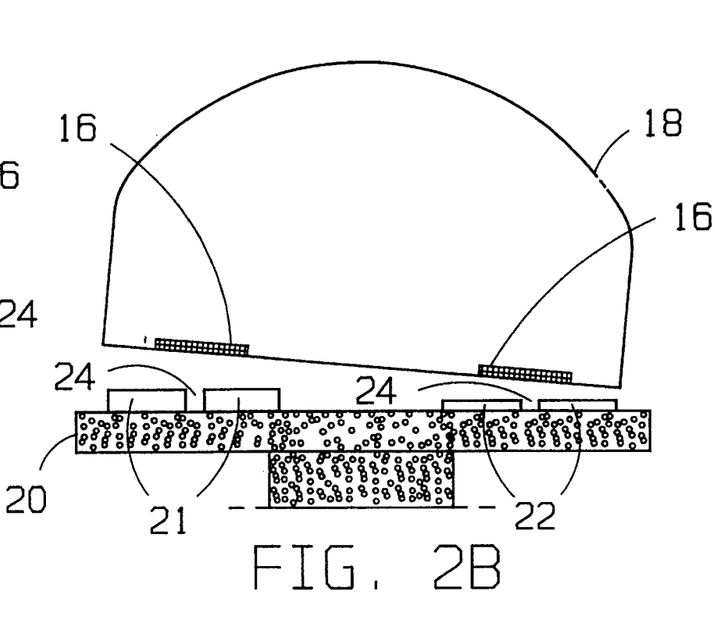
FIG. 2B illustrates the tilting of the vehicle due to changes in the dimensions of the coils and changes in the number of turns forming the coils of one of the magnetic rails.

FIG. 2A depicts a cross sectional view of the double-row loop-coil system mounted on a horizontal guideway 20 with a levitated maglev vehicle 18 and the positioned SCMs 16. Since both levitation and guidance are provided by the loop-coil 12-SCM 16 interaction, no sidewalls are required on the guideway 20. Altering the space 24 between the two rows of loop-coils 12, forming the double-row or rail 17, controls the respective amplitudes of the lift and guidance forces. FIG. 2B depicts a cross sectional view of the double-row loop-coil system where the loop-coils in one double-row or magnetic rail, 21, have a different number of windings or turns and different loop-coil dimensions relative to the other double-row, 22, resulting in a tilting of the vehicle relative to the horizontal when the coils are active. Changing the dimensions of the coils 12 controls the guidance stiffness. The relative number of turns forming the coils and the coil dimensions on one double-row or rail 21 vs. that on the other double-row or rail 22 dictates the degree of tilt the vehicle experiences in a turning situation.

Figure 3:
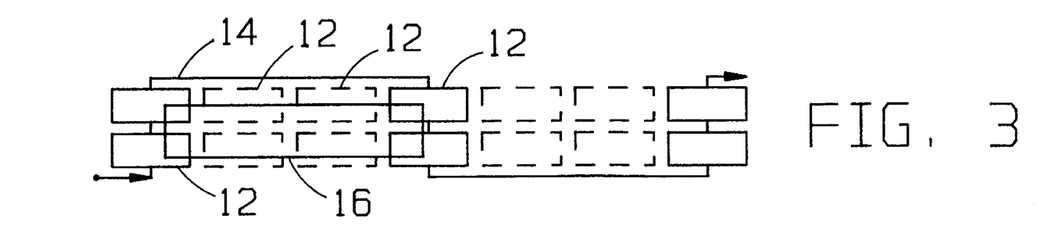
FIG. 3 shows a parallel-connected, integrated double-row loop-coil propulsion configuration for a single magnetic rail.
Figure 4:
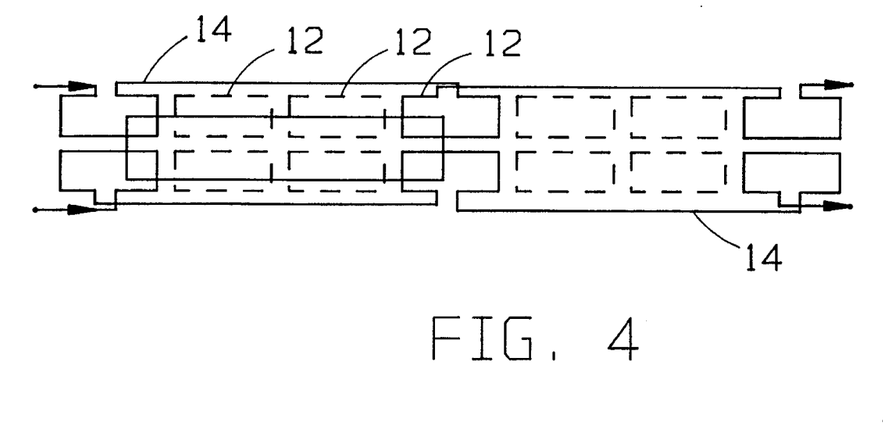
FIG. 4 is of a serially-connected, integrated double-row loop-coil propulsion configuration for a single magnetic rail.

The wiring scheme 14 for one phase of the multiphase propulsion system together with the power source 15 is depicted in FIG. 1. The single phase connection 14 longitudinally interconnects a series of the coils 12 to provide a propulsion force for the vehicle 18; the length 22 of the coils 12 can be designed to control the ratio of the levitation force to the propulsion force. It is possible to connect the multiphase propulsion system to the loop-coils in either a parallel configuration, FIG. 3, or in a series configuration, FIG. 4. The series mode of connection allows for many more turns in each coil 12, thus, increasing the Ampere-turn of the coils on the guideway and subsequently, to reduce the high Ampere-turn requirement on the superconducting coils aboard the vehicle. However, the serially-connected system leads to a relatively short motor section in order to keep the applied voltage relatively low when compared to the parallel connected configuration.

Figure 5:
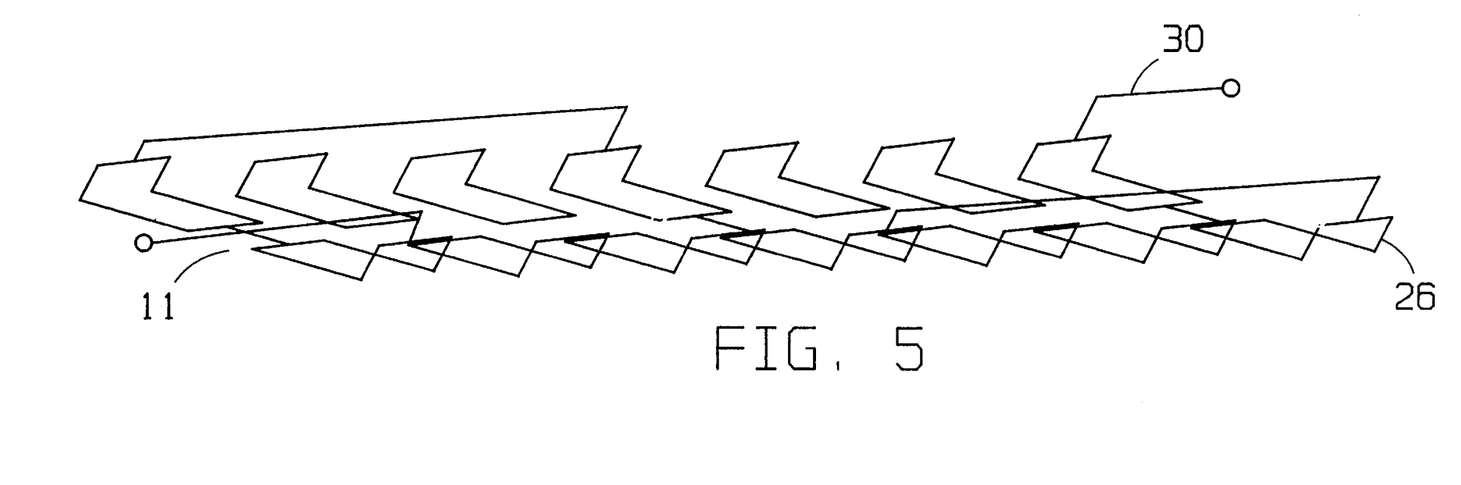
FIG. 5 depicts a double-row bent-loop coil arrangement for one of the magnetic rails which provides maglev levitation, guidance and propulsion.
Figure 6:
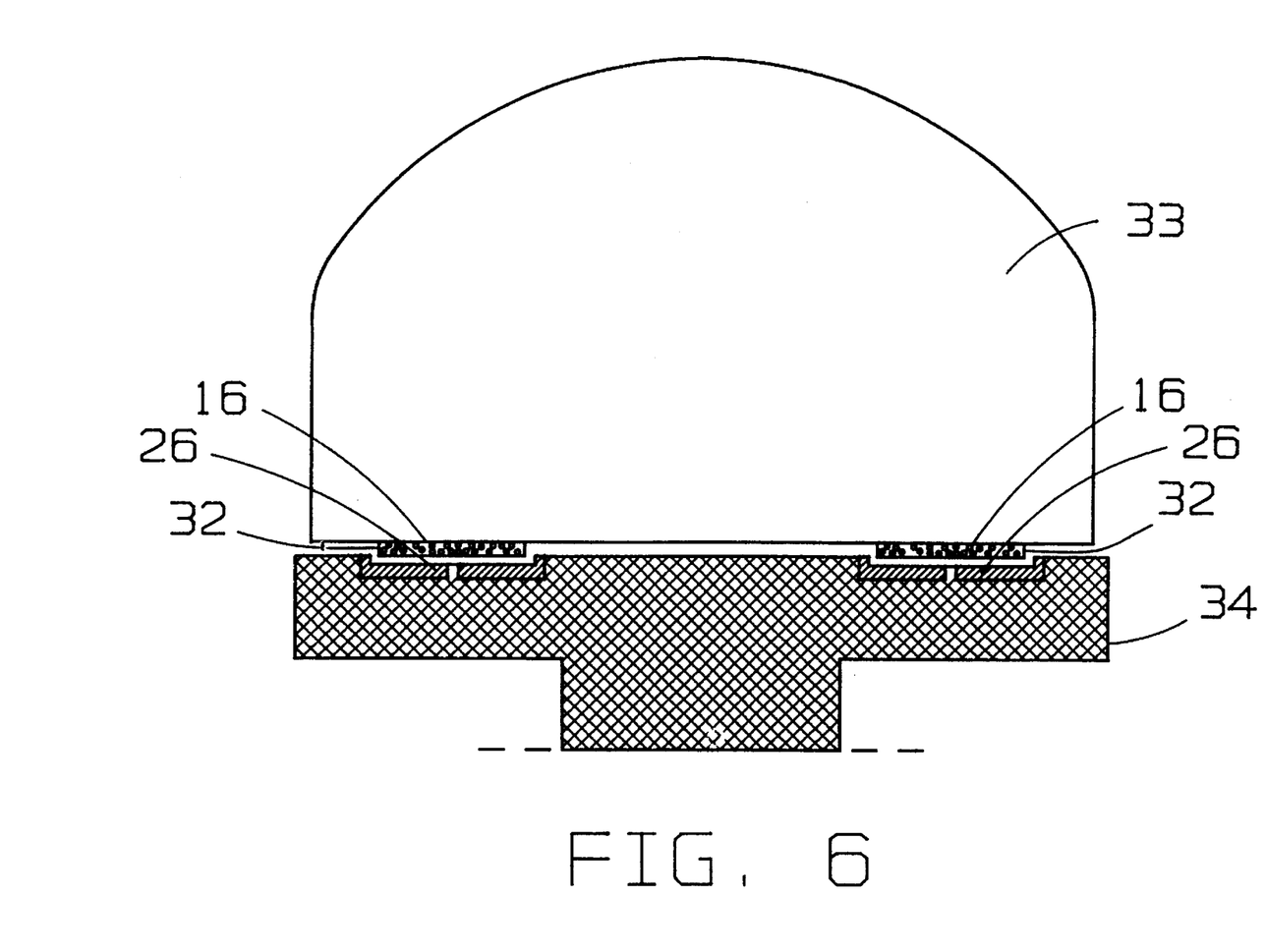
FIG. 6 shows a cross-sectional view of the double-row bent-loop coil guideway and vehicle.

In an alternate embodiment, FIG. 5, the outer edges of the loop-coils 26 forming each magnetic rail 11 are bent at an angle relative to the horizontal base to form a U-shaped structure for each magnetic rail 25. This arrangement enhances the guidance force while maintaining approximately the same levitation force. FIG. 5 also depicts one phase 30 of the multiphase propulsion system connected in parallel to the loop-coils 26. FIG. 6 depicts a cross-sectional view of the bent coils mounted on the slotted guideway 34 where two short keels 32 on a modified vehicle 33 ride in a slotted guideway 34 to provide an increased measure of safety.

Figure 7:
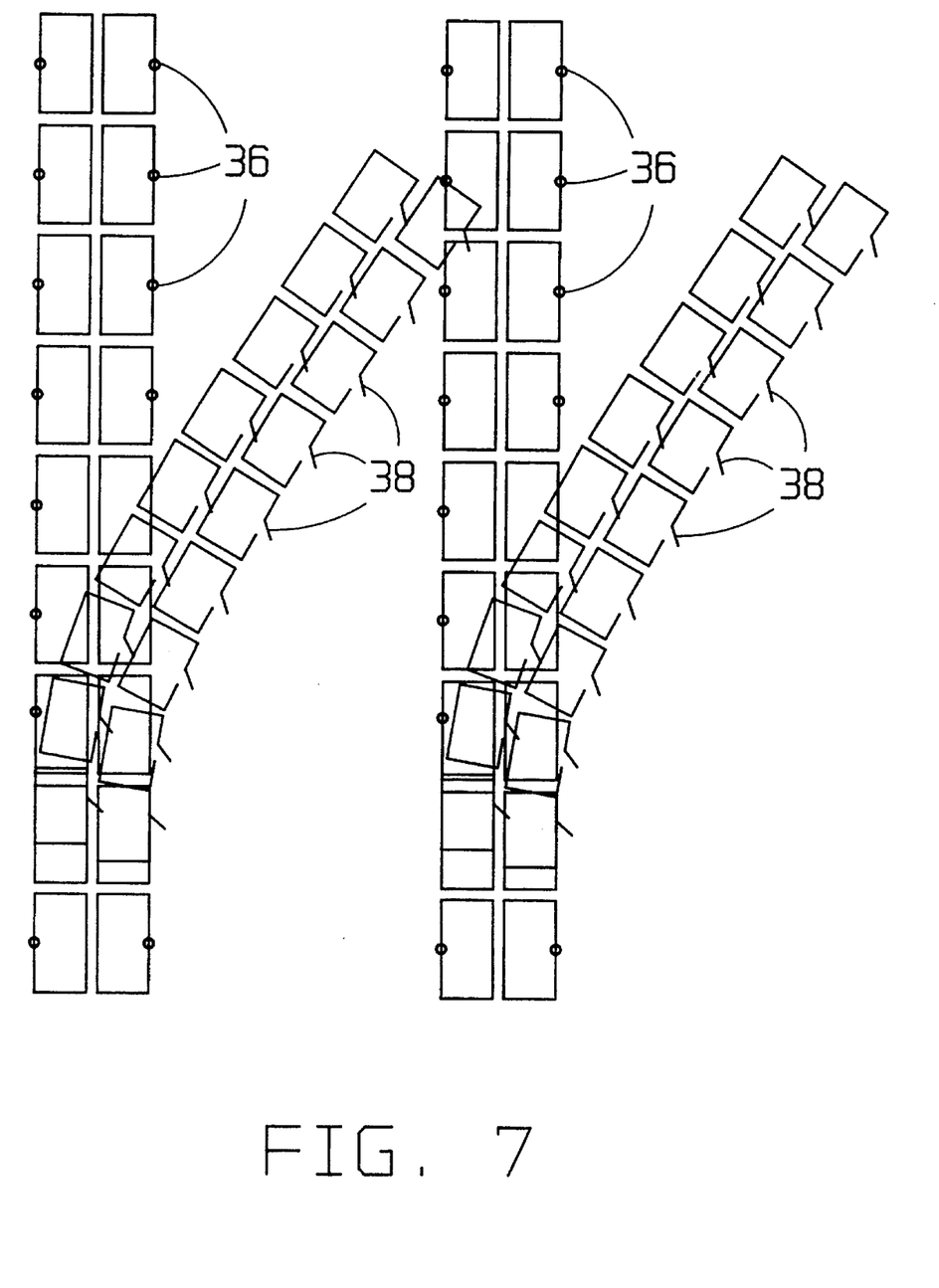
FIG. 7 illustrates a top view of the double row loop-coil concept used for electromagnetic guideway directional switching.
Figure 8:
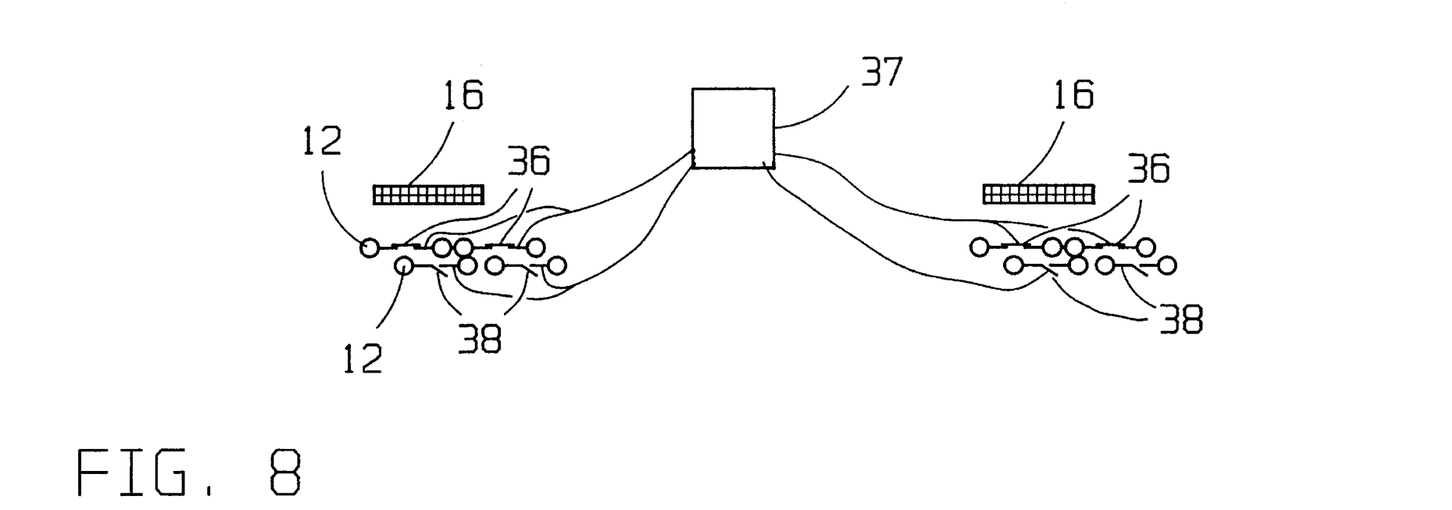
FIG. 8 shows a cross sectional view of the double row loop-coil directional switching scheme.
Figure 9:
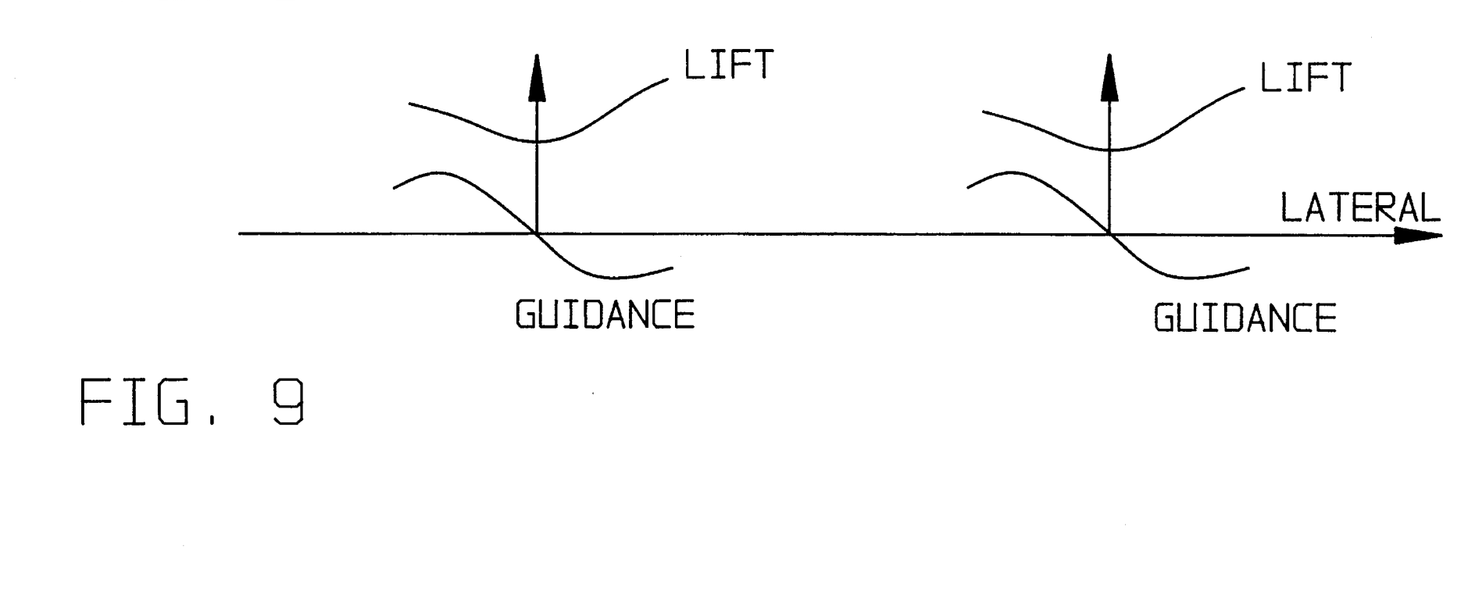
FIG. 9 is the lift and guidance profile before directional switching, that is, when switches 36 are closed and 38 are open.
Figure 10:
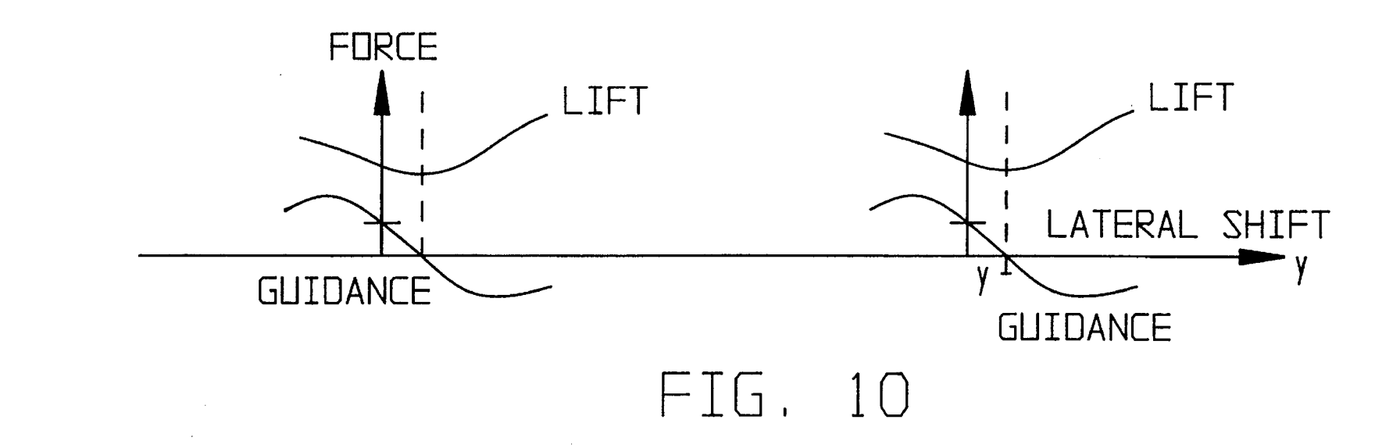
FIG. 10 is the lift and guidance force profile momentarily after switching, that is, when switches 38 are closed and 36 are open.

A directional switching system, FIGS. 7 and 8, results from layering a series of magnetic rails 11 or 17 and coupling specific sets of coils forming these rails to an externally controlled switching system 36 and 38, FIG. 7. FIG. 7 depicts a top-view of the double-row loop-coil directional switching system with one set of switches open 38 and the other set, connected to another set of magnetic rails, closed 36. By controlling the activation of the direction switching mechanism, the direction of travel of the maglev vehicle is controlled. One embodiment for the switching systems 36 and 38 might comprise a series of remotely-controlled two-position solid-state switches. When one set of switches is closed 36 completing the circuit of the double-row coil-loops 12, FIG. 8, and the other set is open 38, FIG. 8, as directed by a control unit 37, the vehicle travels in a stable energy, FIG. 9, well dictating a specified direction. When the relative positions of the switches is reversed so that the previously open loop-coils are now closed and the previously closed are now opened, a lateral force is developed changing the direction of motion of the vehicle, FIG. 10.

Figure 11:
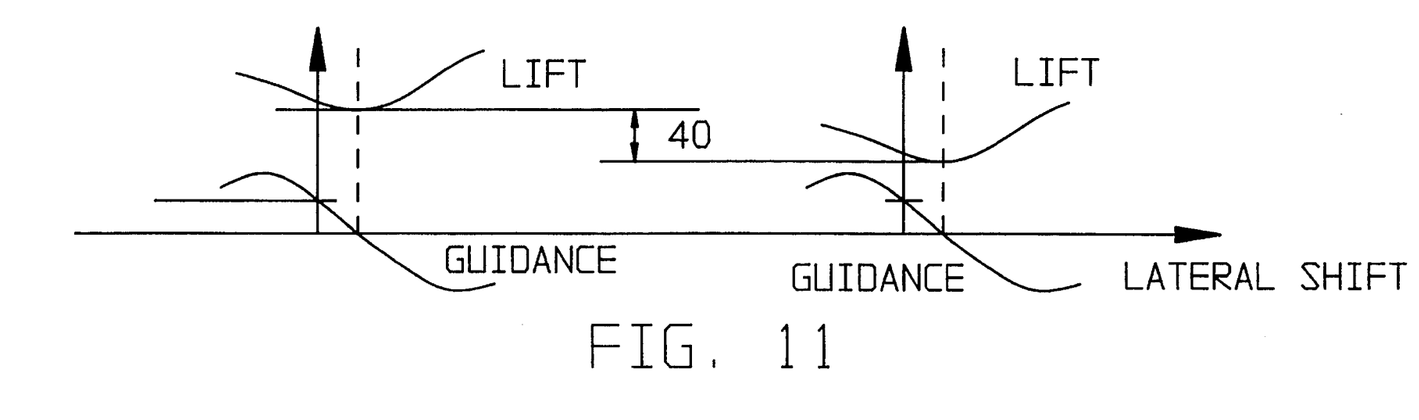
FIG. 11 depicts the change in lift and guidance forces resulting from changing the dimensions of the loop-coils on one side with respect to the other side.

FIG. 11 depicts the change in lift 40 between one magnetic rail and another which occurs by configuring the dimensions and number of turns in the loop-coils of one magnetic rail relative to that of another. This change in the relative lift from one rail to another controls the angle of tilt of the maglev vehicle during directional switching or when negotiating a curve.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiments described explain the principles of the invention and practical applications and should enable others skilled in the art to utilize the invention in various embodiments and with various modifications as are suited to the particular use contemplated. It is intended that the scope of the invention be defined by the claims appended hereto.

The embodiment of this invention in which an exclusive property or privilege is claimed is defined as follows:

1. A magnetic levitation, guidance and propulsion system comprising:

a guideway;

a vehicle adapted to travel over said guideway where said vehicle has a specified direction of motion;

a plurality of conductive loop-coils arranged in such a manner as to form a plurality of parallel rows of loop-coils where beginning with an outside row two successive; adjacent parallel rows combine to form a double-row or a magnetic rail where the system has at least two magnetic rails which are coupled to said guideway;

a multiphase propulsion system in which each phase of said multiphase system connects specific loop-coils of said magnetic rail to specific portions of an external multiphase electrical power system to produce a traveling electromagnetic wave when said loop-coils are energized and thus, forming a propulsion mechanism for said vehicle;

a plurality of superconducting magnets attached to said vehicle and positioned so as to induce a magnetic field in said conductive loop-coils forming said rails as said superconducting magnets move past said conductive loop-coils;

means for producing a directional switching system for said vehicle by use of a switching mechanism which completes a circuit for select coils while removing other coils from the circuit.

2. The system of claim 1 wherein a plurality of selected loop-coils are equipped with a switching mechanism which when closed completes a conductive circuit allowing said selected loop-coils to conduct a current and when open provides a break in the circuit.

3. The system of claim 1 where the multiphase propulsion system is wired in series.

4. The system of claim 2 in which said directional switching means is controlled by an external directional control means which operationally controls said switching mechanisms.

5. The system of claim 2 where said coils associated with said switching mechanism form an overlapping magnetic rail system where said switching mechanisms of one set of rails of said overlapping system are closed and, thus, active while remaining switching mechanisms associated with the remaining rail sets are open and, thus, inactive.

6. The system of claim 1 where said external power source provides three phase power to provide for propulsion of the vehicle.

7. The system of claim 1 where four rows of conductive loop-coils are used to form two magnetic rails.

8. The system of claim 1 whereby the outer edges of said conductive loop-coils, which combine to form a magnetic rail, are bent to form a plurality of L-shaped bent loop-coils; said bent loop-coils are coupled to an alternate guideway having at least two slots to receive said bent loop-coils and where said vehicle is modified so that it has a vehicle base adapted to fit into said slots in said alternate guideway.

9. The system of claim 1 whereby the multiphase propulsion system is wired in parallel.

10. A magnetic levitation, guidance and propulsion system comprising:

a guideway;

a vehicle adapted to travel over said guideway where said vehicle has a specified direction of motion;

a plurality of conductive loop-coils arranged in such a manner as to form a plurality of parallel rows of loop-coils where beginning with an outside row two adjacent parallel rows combine to form a double-row or a magnetic rail where the system has at least two magnetic rails which are coupled to said guideway and where said loop-coils forming said magnetic rail have a specified set of dimensions and a specified number of turns and where by constructing differently said coil dimensions and said turns of one magnetic rail with respect to the other results a specified angle of tilt for said vehicle during directional switching or when negotiating a curve;

a multiphase propulsion system in which each phase of said multiphase system connects specific loop-coils of said magnetic rail to specific portions of an external multiphase electrical power system to produce a traveling electromagnetic wave when said loop-coils are energized and thus, forming a propulsion mechanism for said vehicle;

a plurality of superconducting magnets attached to said vehicle and positioned so as to induce a magnetic field in said conductive loop-coils forming said rails as said superconducting magnets move past said conductive loop-coils;

means for producing a directional switching system for said vehicle by use of a switching mechanism which completes a circuit for select coils while removing other coils from the circuit.

11. The system of claim 10 whereby the multiphase propulsion system is wired in parallel.

12. The system of claim 10 where the multiphase propulsion system is wired in series.

13. The system of claim 10 where four rows of conductive loop-coils are used to form two magnetic rails.

14. The system of claim 10 wherein a plurality of selected loop-coils are equipped with a switching mechanism which when closed completes a conductive circuit allowing said selected loop-coils to conduct a current and when open provides a break in the circuit.

15. The system of claim 10 in which said directional switching means is controlled by an external directional control means which operationally controls said switching mechanisms.

16. The system of claim 10 where said coils associated with said switching mechanism form an overlapping magnetic rail system where said switching mechanisms of one set of rails said overlapping system are closed and, thus, active while remaining switching mechanisms associated with the remaining rail sets are open and, thus, inactive.

17. The system of claim 10 where said external power source provides three phase power to provide for propulsion of the vehicle.

18. The system of claim 10 whereby the outer edges of said conductive loop-coils, which combine to form a magnetic rail, are bent to form a plurality of L-shaped bent loop-coils; said bent loop-coils are coupled to an alternate guideway having at least two slots to receive said bent loop-coils and where said vehicle is modified so that it has a vehicle base adapted to fit into said slots in said alternate guideway.

* * * * *